United States Patent [19]

Kuivalainen

[11] Patent Number: 4,932,363
[45] Date of Patent: Jun. 12, 1990

[54] FLUIDIZED BED REACTOR

[75] Inventor: Reijo J. Kuivalainen, Karhula, Finland

[73] Assignee: A. Ahlstrom Corporation, Noormarkku, Finland

[21] Appl. No.: 279,157

[22] PCT Filed: May 15, 1987

[86] PCT No.: PCT/FI87/00067
§ 371 Date: Nov. 21, 1988
§ 102(e) Date: Nov. 21, 1988

[87] PCT Pub. No.: WO87/07356
PCT Pub. Date: Dec. 3, 1987

[51] Int. Cl.$^5$ .............................. F22B 1/00
[52] U.S. Cl. .......................... 122/4 D; 110/216; 110/245
[58] Field of Search ............ 110/245; 122/4 D; 432/58, 15

[56] References Cited

U.S. PATENT DOCUMENTS

| 4,253,425 | 3/1981 | Gamble et al. | 122/4 D |
| 4,419,966 | 12/1983 | Jenkins et al. | 122/4 D |
| 4,565,139 | 1/1986 | Sage et al. | 110/245 |
| 4,640,201 | 2/1987 | Holmes | 110/245 |
| 4,672,918 | 6/1987 | Engstrom et al. | 110/4 D |
| 4,679,511 | 7/1987 | Holmes | 110/245 |
| 4,699,068 | 10/1987 | Engstrom | 122/4 D |
| 4,708,092 | 11/1987 | Engstrom | 110/245 |
| 4,732,113 | 3/1988 | Engstrom | 110/245 |
| 4,755,134 | 7/1988 | Engstrom et al. | 122/4 D |
| 4,813,380 | 3/1989 | Engstrom | 110/4 D |

FOREIGN PATENT DOCUMENTS

| 1344442 | 10/1963 | France. |
| 8201589-2 | 3/1983 | Sweden. |
| 1027469 | 7/1983 | U.S.S.R. |
| 1110991 | 8/1984 | U.S.S.R. |
| 1245806 | 12/1986 | U.S.S.R. |
| 662072 | 11/1951 | United Kingdom. |
| 1443528 | 7/1976 | United Kingdom. |
| 1540758 | 2/1979 | United Kingdom. |
| 2130118 | 5/1984 | United Kingdom. |
| 85/04117 | 9/1985 | World Int. Prop. O. |

Primary Examiner—Henry C. Yuen
Attorney, Agent, or Firm—Nixon & Vanderhye

[57] ABSTRACT

A fluidized bed reactor includes a reactor chamber, a solids separator and means for returning the separated solids to the reactor chamber. The separator has a separation chamber (7) which comprises a curved upper wall (9) and a lower wall (10) which forms gas outlets (13), said walls being connected to a solids returning duct (11). Preferably the lower wall forms a plurality of inclined surfaces or chutes (35) slanted downwardly towards the solids returning ducts (31).

17 Claims, 4 Drawing Sheets

FLUIDIZED BED REACTOR

The present invention relates to a fluidized bed reactor apparatus comprising a reactor chamber, a separator for separating solid material or particles from the flue gases and means for returning the separated solids to the reactor chamber.

In fluidized bed reactors, some of the fluidized solid particles follow the flue gases as these are discharged from the reactor chamber. To purify the gases and to recover the solids, the solids have to be separated from the gases, which is why fluidized bed reactors are usually equipped with a cyclone separator. Especially in big fluidized bed reactors, where the gas flows are substantial and several separators operating side by side are needed, the channel system required by the gases is complicated.

It is an object of the invention to provide an apparatus of a simple construction for separating solids and for returning them to the reactor chamber. The apparatus according to the invention is suitable for slow as well as for fast-operating fluidized bed reactors, the latter of which contain considerable amounts of solids to be separated from the flue gases and to be returned to the reactor.

The apparatus according to the invention utilizes concentration of solid particles, brought about by centrifugal force, on the periphery of a gas flow conveyed along a curved surface, whereby a major part of the particles contained in the gas become separated. In a preferred embodiment of the invention, solid particles are separated simultaneously by leading the rest of the gas containing solid particles through flow channels or passages which cause changes in the flow direction of the gas and in which channels the particles are, thanks to inertia forces, separated from the gas flow and discharged. Use of the separator based on the latter phenomenon as disclosed in the Swedish patent application 8201589-2.

The invention is mainly characterized in that the separator in the fluidized bed reactor has a separation chamber which comprises a curved upper wall and a lower wall that forms a gas outlet or outlets and that these walls are connected to the solids returning duct or ducts.

The invention will be described further, by way of example, with reference to the accompanying schematic drawings, in which FIG. 1 is a vertical section of a fluidized bed reactor in accordance with a first embodiment of the invention;

Figure 1:
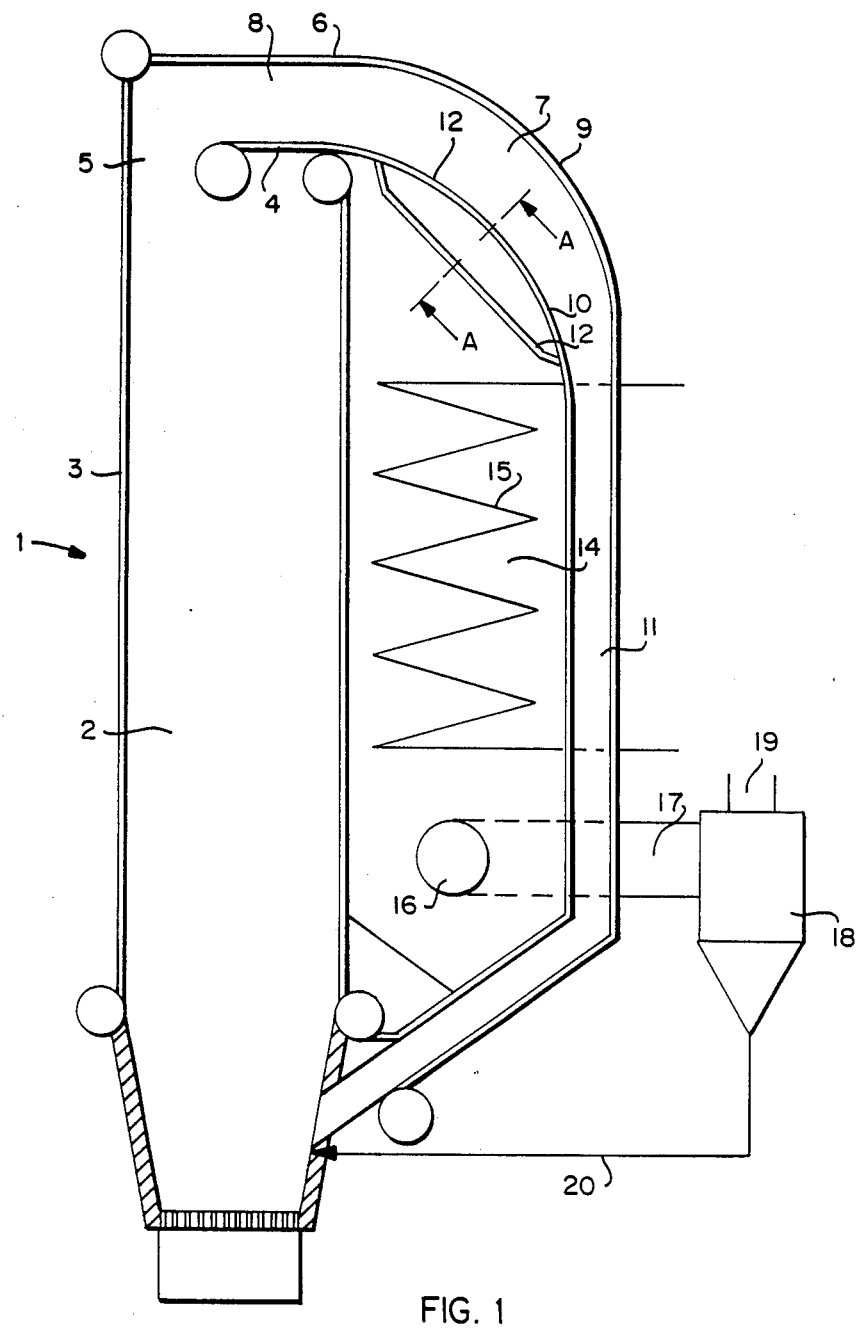
Figure 2:
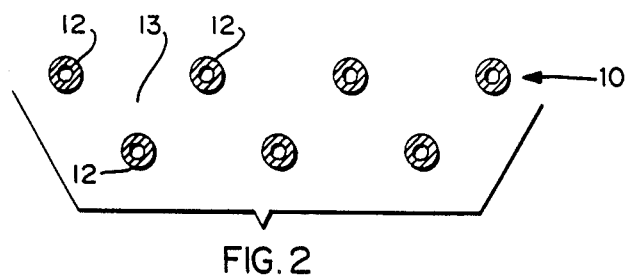
FIG. 2 is an enlarged section of FIG. 1 taken along line A—A.

FIGS. 1 and 2 illustrate a fluidized bed steam boiler 1 having a combustion chamber 2 which is by known methods formed with tubular walls. The upper part of the combustion chamber 2 is provided with a fuel gas outlet 5 between front wall 3 and roof 4. Above the roof 4 of the combustion chamber there is a wall 6, which, together with the roof 4, forms a gas inlet channel 8 leading to separation chamber 7. The separation chamber 7 comprises a curved upper wall 9 connected to the wall 6 and a curved lower wall 10 having an opening and being connected to the roof 4. The walls 9 and 10 are connected to a solids returning duct 11 leading to the bottom part of the combustion chamber.

The upper wall of the separation chamber 7 forms a cylindrical surface of approximately 90°. The lower wall of the separation chamber is composed of tubes 12 belonging to the water/steam system of the boiler. Every other of said tubes is, as shown in FIG. 2, bent apart or displaced so as to form openings 13 for passage of gas between adjacent tubes. Through these openings 13, the separation chamber is in contact with a convection part 14, which is next to the combustion chamber 7 and is provided with heat transfer surfaces 15 as schematically illustrated.

At the bottom part of the convection part 14, there is a gas outlet 16 which is connected by means of a tube 17 to a cyclone separator 18, wherefrom the gas is discharged through a line 19 and the separated solids are returned through a line 20 and by means of a conveying gas to the combustion chamber 2.

The gases containing solid particles and discharged from the top part of the combustion chamber through the opening 5 are further led to the separation chamber by the inlet channel 8. As the gases flow guided by the wall 9, most of the solid particles are separated onto the curved wall 9 of the separation chamber and are further driven by their kinetic force to the solids returning duct 11. The gas and that part of the solids which has not been separated in the separation chamber passes through the openings 13 between the pipes 12 to the convection part 14, wherefrom the gas, after it has trasferred heat, will pass to the cyclone separator 18, where the remaining solids will be separated. As the major part of the solids has already been separated in the separation chamber 7, the cyclone separator, which serves as an after-separator, can be dimensioned smaller than is usually used in known steam boilers.

The separating capacity of the curved-wall separation chamber is not as good as that of the cyclone separator which usually is used to purify the gases before the convection part. Therefore, more particles likely to wear the heat surfaces flow through the convection part. However, this is not only harmful because, thanks to the sweeping effect, the heat surfaces are more readily kept clean. An appropriate design makes it possible to minimize the disadvantages which might be caused by wear.

Figure 4:
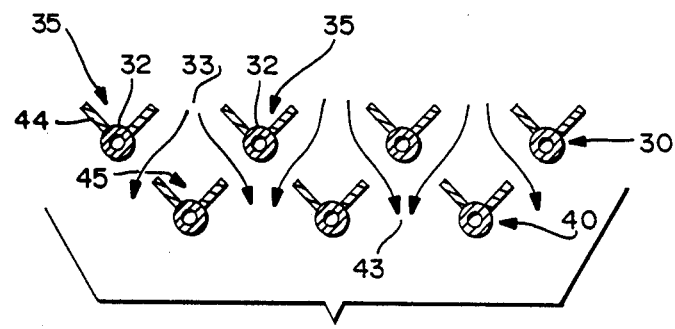
FIG. 4 is an enlarged section of FIG. 3 taken along line B—B of FIG. 3.
Figure 3:
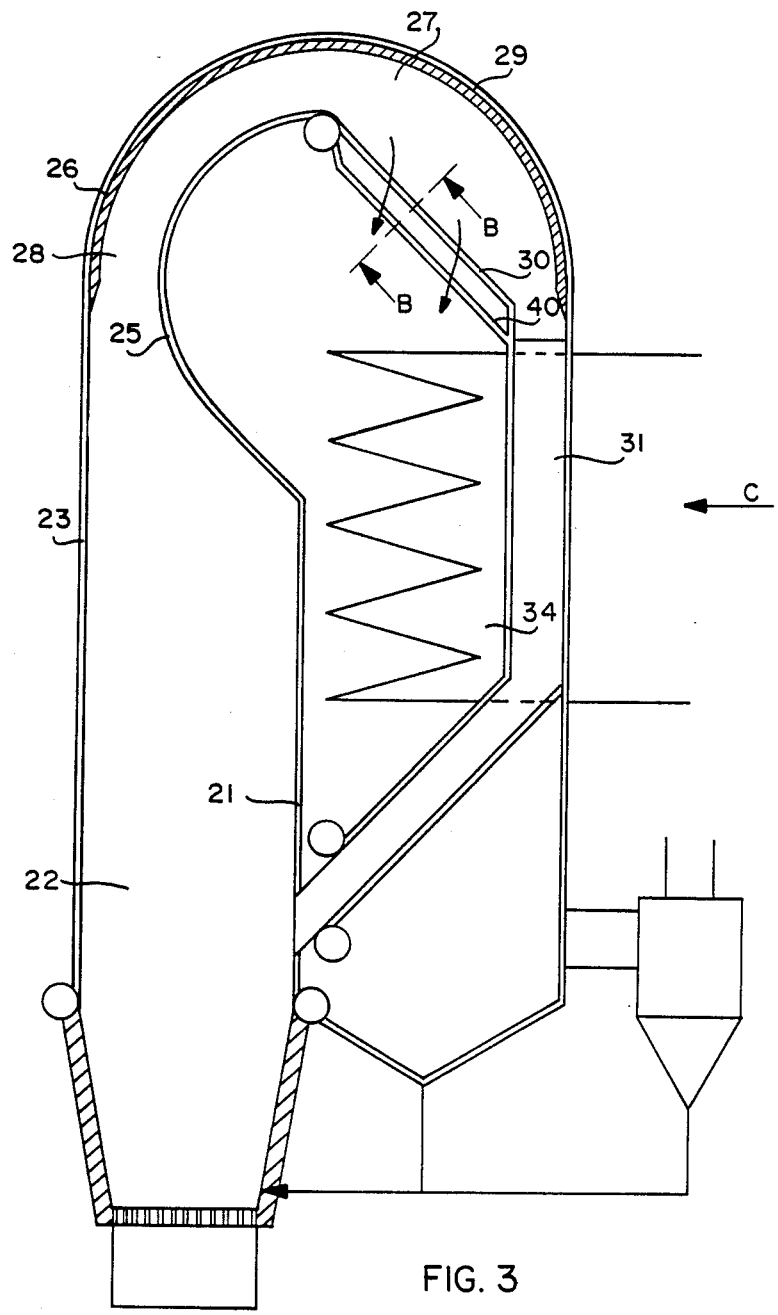
FIG. 3 is a vertical section of a second embodiment of the invention.
Figure 5:
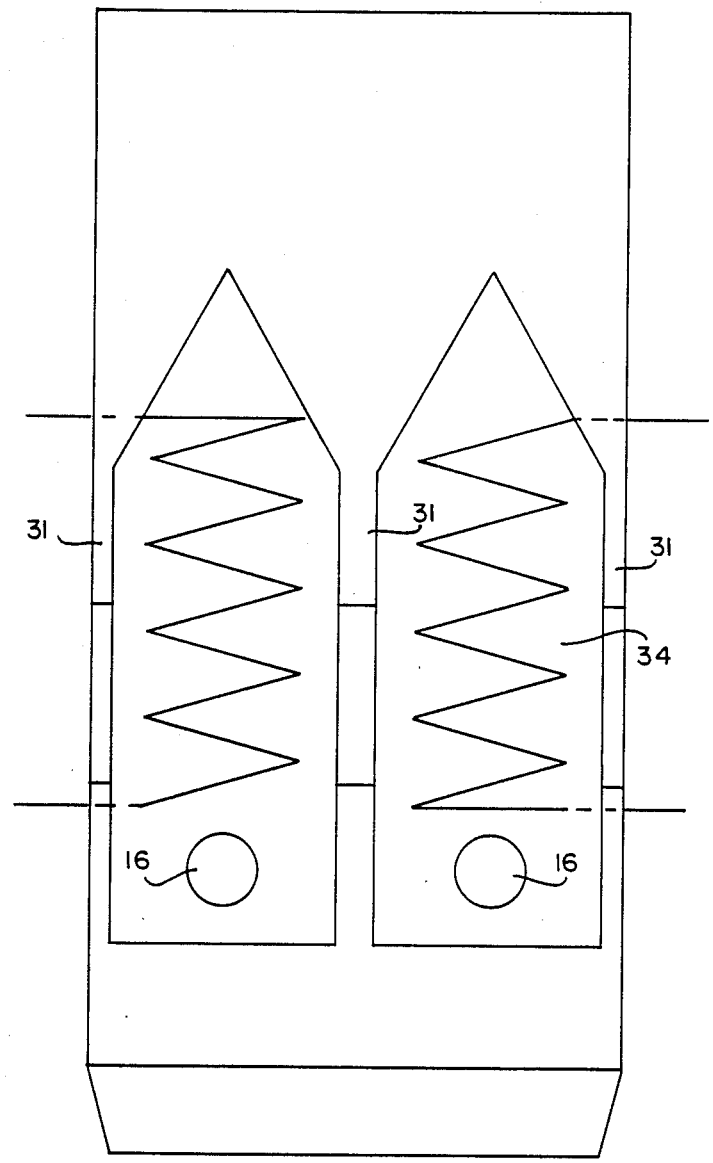
FIG. 5 is a schematic elevational view of the reactor when viewed in the direction of arrow C of FIG. 3.

In the embodiment shown in FIGS. 3 and 4, back wall 21 of a combustion chamber 22 in the fluidized bed reactor is in the top part of the reactor first bent towards the front wall 23 and thereafter bent to follow the contour of the front wall curve so that there is formed, together with the curved top part of the front wall, an inner wall 25 and an outer wall 26 of the gas inlet channel 28. The outer wall 26 of the inlet channel 28 is connected to a top wall 29 of a separation chamber 27 and together they form an approximately 180° cylindrical surface. A lower wall 30 of the separation chamber, having openings, is composed of pipes 32, on which plates 44 have been welded so as to form several adjacent chutes 35, between which gas outlets 33 are formed. The pipes are, as shown in FIG. 4, arranged at two levels in a staggered or zigzag form so that the gas flowing through the pipes is forced to change direction several times whilst flowing through the openings 33 and 43 between the chutes 35 and 45 in the walls 30 and 40 which are on top of each other, whereby solid particles become separated from the gas. The chutes are slanting downwardly towards the solids returning ducts 31 and are at their bottom ends connected to said returning ducts 31. There are three returning ducts 31, as shown in FIG. 5, and the one disposed in the middle divides the convection part 34 into two sections.

Most of the solid particles are separated from the gas while such is flowing along the curved surface formed by the outer wall 26 of the inlet channel 8 and the upper wall 29 of the separation chamber 27 and are conveyed, guided by said surface, to the solids returning ducts 31. A portion of the solid particles is separated when the gas keeps changing its direction while being discharged from the separation chamber through the outlets 33. The particles are received in or recovered by chutes 35 and 45 and flow along the slanting chutes to the solids returning ducts 31. Because particles are separated at two stages before the convection part 34, there are less solids flowing with gas to said convection part than in the embodiment shown in FIG. 1.

The invention is not intended to be limited to the above embodiments, but various modifications and applications are possible within the inventive concept of the accompanying patent claims.

I claim:

1. A fluidized bed reactor comprising:
   a reactor chamber having a front wall and back wall;
   a separator, outside the reactor chamber, for separating solid material from the flue gases;
   means for returning separated solids to the reactor chamber including at least one return duct;
   said separator comprising a separation chamber having a curved upper wall connected to an upper part of the front wall of the reactor chamber, and a lower downwardly slanting wall connected to an upper part of the back wall of the reactor chamber;
   said upper and lower walls of said separator being connected to said separated return duct;
   said lower wall being at least partly formed of longitudinally arranged cooling tubes and means for mounting the cooling tubes to leave passages for downwards flow of flue gas between adjacent tubes; and
   said lower wall further comprising first chutes mounted on said cooling tubes for separation of solid particles from the flue gas, said chutes being downwardly inclined and leading separated solid particles downwards into the separated solids return duct.

2. A fluidized bed reactor as recited in claim 1, wherein the upper wall of the separation chamber forms a cylindrical surface of about 90°.

3. A fluidized bed reactor as recited in claim 1, further comprising a wall of an inlet channel joined with the separation chamber, said inlet channel wall and the upper wall of the separation chamber forming a cylindrical surface of about 180°.

4. A fluidized bed reactor as recited in claim 1 wherein the lower wall of the separation chamber is curved.

5. A fluidized bed reactor as recited in claim 2 wherein the lower wall of the separation chamber is curved.

6. A fluidized bed reactor as recited in claim 3 wherein the lower wall of the separation chamber is curved.

7. A fluidized bed reactor as recited in claim 1 further comprising at least one additional wall, with openings therein, below said lower wall of the separation chamber, and spaced from said lower wall, said openings forming adjacent, downwardly slanting second chutes, said second chutes being staggered with respect to said first chutes so as to make through-flowing gas change its direction several times while it is flowing through said passages and openings in said walls.

8. A fluidized bed reactor as recited in claim 7 wherein said at least one additional wall is at least partly formed of longitudinally arranged cooling tubes, and wherein said second chutes are mounted on said cooling tubes.

9. A fluidized bed reactor comprising:
   a reactor chamber having a front wall and a back wall, combustion in said reactor chamber creating flue gases which flow upwardly from said reactor chamber;
   means for effecting recovery of heat from the flue gases from the reactor chamber, and for effecting separation of solid material from the flue gases, said means comprising a plurality of cooling tubes, means for mounting said cooling tubes so that they are generally parallel to and spaced from each other defining passages therebetween which passages abruptly change the direction of flue gases flowing therethrough, and a first chute mounted on each of said cooling tubes for separation of solid particles from the flue gases, said first chutes being downwardly inclined; and
   means for returning separated solids to said reactor chamber, including at least one return duct disposed at the bottom of the downwardly inclined first chutes.

10. A fluidized bed reactor as recited in claim 9 wherein said means for effecting heat recovery and particle separation comprises a second set of cooling tubes, means for mounting said second set of cooling tubes so that they are generally parallel with passages therebetween and so that the passages therebetween are staggered with respect to the passages in said first set of cooling tubes so as to make through-flowing gas change its direction several times when flowing through the passages, and second downwardly inclined chutes mounted on said second cooling tubes for discharging separated solids into said return duct.

11. A fluidized bed reactor as recited in claim 10 wherein a plurality of return ducts are provided.

12. A fluidized bed reactor as recited in claim 9 wherein said means for effecting heat recovery and particle separation comprise a separation chamber having a curved upper wall, and said first set of cooling tubes comprising a lower downwardly slanting wall of said separation chamber.

13. A fluidized bed reactor as recited in claim 12, wherein the upper wall of the separation chamber forms a cylindrical surface of about 90°.

14. A fluidized bed reactor as recited in claim 12, further comprising a wall of an inlet channel joined with the separation chamber, said inlet channel wall and the upper wall of the separation chamber forming a cylindrical surface of about 180°.

15. A fluidized bed reactor as recited in claim 12 wherein the lower wall of the separation chamber is curved.

16. A fluidized bed reactor as recited in claim 2 further comprising a refractory lining on said upper wall cylindrical surface to prevent hot particles from damaging said upper wall.

17. A fluidized bed reactor as recited in claim 13 further comprising a refractory lining on said upper wall cylindrical surface to prevent hot particles from damaging said upper wall.

* * * * *